United States Patent [19]
Satoh et al.

[11] Patent Number: 5,640,600
[45] Date of Patent: Jun. 17, 1997

[54] STORAGE CONTROLLER AND BUS CONTROL METHOD FOR USE THEREWITH

[75] Inventors: Takao Satoh, Sagamihara; Hisaharu Takeuchi; Yasuo Inoue, both of Odawara; Akira Yamamoto, Sagamihara, all of Japan

[73] Assignee: Hitachi, Ltd., Tokyo, Japan

[21] Appl. No.: 381,560

[22] Filed: Jan. 31, 1995

[30] Foreign Application Priority Data

Feb. 9, 1994 [JP] Japan .................................... 6-015255

[51] Int. Cl.⁶ .................................................. H01J 3/00
[52] U.S. Cl. .................. 395/853; 395/825; 395/826; 395/835; 395/849; 395/834; 395/854; 395/287; 395/292; 395/750; 395/444; 395/445; 395/438; 395/440; 395/494; 395/497.01; 395/308; 395/306
[58] Field of Search ..................... 395/834, 853, 395/854, 880, 200.13, 200.03, 200.06, 200.08, 200.11, 287, 293, 308, 299, 650, 438, 440, 849, 494, 497.01, 306, 550, 750

[56] References Cited

U.S. PATENT DOCUMENTS

| | | | |
|---|---|---|---|
| 4,633,387 | 12/1986 | Hartung et al. | 395/200.13 |
| 5,003,465 | 3/1991 | Chisholm et al. | 395/200 |
| 5,097,410 | 3/1992 | Hester et al. | 395/275 |
| 5,135,563 | 8/1992 | Tayler et al. | 395/250 |
| 5,155,807 | 10/1992 | Blevins et al. | 395/200 |
| 5,241,677 | 8/1993 | Naganuma et al. | 395/200.15 |
| 5,253,351 | 10/1993 | Yamamoto et al. | 395/425 |
| 5,280,587 | 1/1994 | Shimodaira et al. | 395/821 |
| 5,450,584 | 9/1995 | Sekiguchi et al. | 395/650 |

*Primary Examiner*—Jack B. Harvey
*Assistant Examiner*—Raymond N. Phan
*Attorney, Agent, or Firm*—Fay, Sharpe, Beall, Fagan, Minnich & McKee

[57] ABSTRACT

A storage controller comprising a storage device adapter, a channel adapter, a cache memory, a control memory, and a plurality of buses connecting therebetween. The channel adapter communicates with a processor and processes input/output requests issued by the processor. The storage device adapter controls a storage device and data transfer between the storage device and the cache memory. The channel adapter and the storage device adapter exchanges control information via the control memory. The buses are used to transfer the data and the control information between the cache memory and the control memory, and the channel adapter and the storage device adapter. The controller also comprises bus load estimating means and bus mode selecting means. The bus load estimating means estimates bus load characteristics as an index based on the amount of data transfer during sequential access to the storage device. The bus mode selecting means determines a bus mode of bus utilization based on the index. Each of the channel adapter and the storage device adapter has bus access means for accessing the buses in accordance with the bus mode selected by the bus mode selecting means.

13 Claims, 19 Drawing Sheets

FIG. 10

| BUS MODE<br>BUS | NORMAL<br>MODE | SEQUENTIAL<br>MODE | RANDOM<br>MODE |
|---|---|---|---|
| BUS a | FOR<br>CONTROL DATA<br>TRANSFER | FOR<br>CONTROL DATA<br>TRANSFER | FOR<br>CONTROL DATA<br>TRANSFER |
| BUS b | FOR<br>DATA<br>TRANSFER | FOR<br>DATA<br>TRANSFER | FOR CONTROL DATA<br>TRANSFER<br>AND DATA TRANSFER |

FIG. 17

| BUS \ BUS MODE | SEQUENTIAL MODE | RANDOM MODE |
|---|---|---|
| BUS a | FOR CONTROL DATA TRANSFER | FOR CONTROL DATA TRANSFER |
| BUS b | FOR DATA TRANSFER | FOR DATA TRANSFER |
| BUS c | FOR DATA TRANSFER | FOR CONTROL DATA TRANSFER |

FIG. 21

| BUS \ BUS MODE | BUS 56 FAILURE MODE | BUS 57 FAILURE MODE | BUS 58 FAILURE MODE | BUS 56/57 FAILURE MODE |
|---|---|---|---|---|
| BUS 56 | — | FOR DATA TRANSFER | FOR CONTROL DATA TRANSFER | — |
| BUS 57 | FOR DATA TRANSFER | — | FOR DATA TRANSFER | — |
| BUS 58 | FOR CONTROL DATA TRANSFER | FOR CONTROL DATA TRANSFER | — | FOR CONTROL DATA TRANSFER AND DATA TRANSFER |

STORAGE CONTROLLER AND BUS CONTROL METHOD FOR USE THEREWITH

BACKGROUND OF THE INVENTION

The present invention relates to a storage controller and a bus control method for use therewith. More particularly, the invention relates to a bus control method and a storage controller with which the bus control method is implemented. The method of the invention dynamically controls the mode of bus utilization within the storage controller in accordance with the operation mode of the computer system connected to the controller.

The storage controller located between the central processing unit (CPU) and a storage device controls data transfer therebetween in response to input/output requests from the CPU. Recently, the so-called multi-processor method has found its way into a growing number of storage controller installations for higher throughput and higher reliability. In such cases, the common bus connection scheme for connecting the component processors constituting the storage controller is known to offer good functional expandability. Two kinds of data are transferred over the bus: control data required by the storage controller for processing the input/output requests from the CPU, and ordinary data exchanged between the CPU and the storage controller.

One conventional example of the multi-processor type storage controller utilizing the common bus connection scheme is the file controller described in "FUJITSU, VOL. 42, No. 1, pp. 12–20 (1991)." This file controller has its component functions divided into a plurality of modules each of which has a microprocessor assigned to it. These modules are connected by a common bus. Each module and the common bus are multiplexed to provide higher reliability.

Conventional storage controllers which adopt the common bus utilization mode are matched to the principal mode of the computer system to which they are connected. For example, computer systems for primarily performing online processing must ensure sufficient responsiveness during operation and therefore adopt a common bus utilization mode that emphasizes control data transfer throughput. On the other hand, computer systems for carrying out batch processing frequently handle large quantities of data and thus adopt a common bus utilization mode that emphasizes data transfer throughput.

SUMMARY OF THE INVENTION

Dynamic switching of the common bus utilization mode has yet to be implemented with conventional storage controllers. For this reason, when the operation mode of the connected computer system changes, the efficiency of the bus utilization may be decreased, which can prevent the resources of the storage controller from being used effectively. An example of this is a bank online computer system operating according to a common bus utilization method that emphasizes control data transfer throughput. During the day, the bus utilization efficiency is high when the system is dealing with large proportions of online processing load involving automatic teller machines. At night, however, the bus utilization efficiency of the system is decreased because of the significantly greater proportion of batch processing load that is handled by the system involving credit settlement. In the latter case, the resources of the storage controller may not be utilized effectively.

It is therefore an object of the present invention to provide a storage controller and a bus control method for use therewith, wherein the method dynamically controls the mode of common bus utilization in response to the change in the operation mode of the computer system connected to the storage controller.

According to an aspect of the invention, there is provided a storage controller having a storage device adapter, a channel adapter, a cache memory, a control memory, and a plurality of buses connecting therebetween. The channel adapter communicates with a processor and processes input/output requests issued by the processor. The storage device adapter controls a storage device and data transfer between the storage device and the cache memory. The channel adapter and the storage device adapter exchange control information via the control memory. The buses are used to transfer the data and the control information between the cache memory and the control memory, and the channel adapter and the storage device adapter. The controller also comprises bus load estimating means for obtaining an index for bus load characteristics. Preferably, the index is obtained on the basis of the amount of data transfer during sequential access to the storage device. Particularly, the residual bytes of sequential access to the storage device can be used as the index. The controller, further more, has bus mode selecting means for determining the mode of bus utilization based on the index. Each of the channel adapter and the storage device adapter has bus access means for accessing the buses in accordance with the bus mode selected by the bus mode selecting means.

According to an aspect of the invention, therefore, the index for bus load characteristics is obtained, and the bus mode is determined on the basis of the obtained index. Each of the modules, such as the channel adapter and the storage control adapter, access the buses in accordance with determined bus mode. As a result, the buses can be used efficiently. Particularly, by using the residual bytes of sequential access data transfer to the storage device as the index, it is possible to determine the appropriate bus mode according to the amount of data transfer on the buses. For example, if the amount of data transfer resulting from the ongoing sequential access is on the increase, the load characteristic is estimated to involve a growing proportion of sequential access. The mode of bus utilization selected in this case is one which emphasizes data transfer throughput. If the amount of data transfer stemming from the current sequential access is on the decrease, the load characteristic is estimated to involve a growing proportion of random access. The mode of bus utilization selected in this case is one which emphasizes control data transfer throughput. With this, a drop in the efficiency of bus utilization is prevented by appropriately switching between two different modes of bus utilization. The resources of the storage controller may be utilized effectively, as a result, even when the operation mode of the connected computer system changes.

BRIEF DESCRIPTION OF THE DRAWINGS

FIG. 10 is a table showing bus mode assignments according to the first embodiment.

FIG. 17 is a table showing bus mode assignments according to the second embodiment.

FIG. 21 is a table showing the bus mode assignments in the case of bus failures occurring.

DETAILED DESCRIPTION OF THE PREFERRED EMBODIMENTS

Preferred embodiments of the invention will now be described with reference to the accompanying drawings. However, these embodiments should not be construed as limiting the scope of the invention, but merely as providing illustrations thereof.

Figure 1:
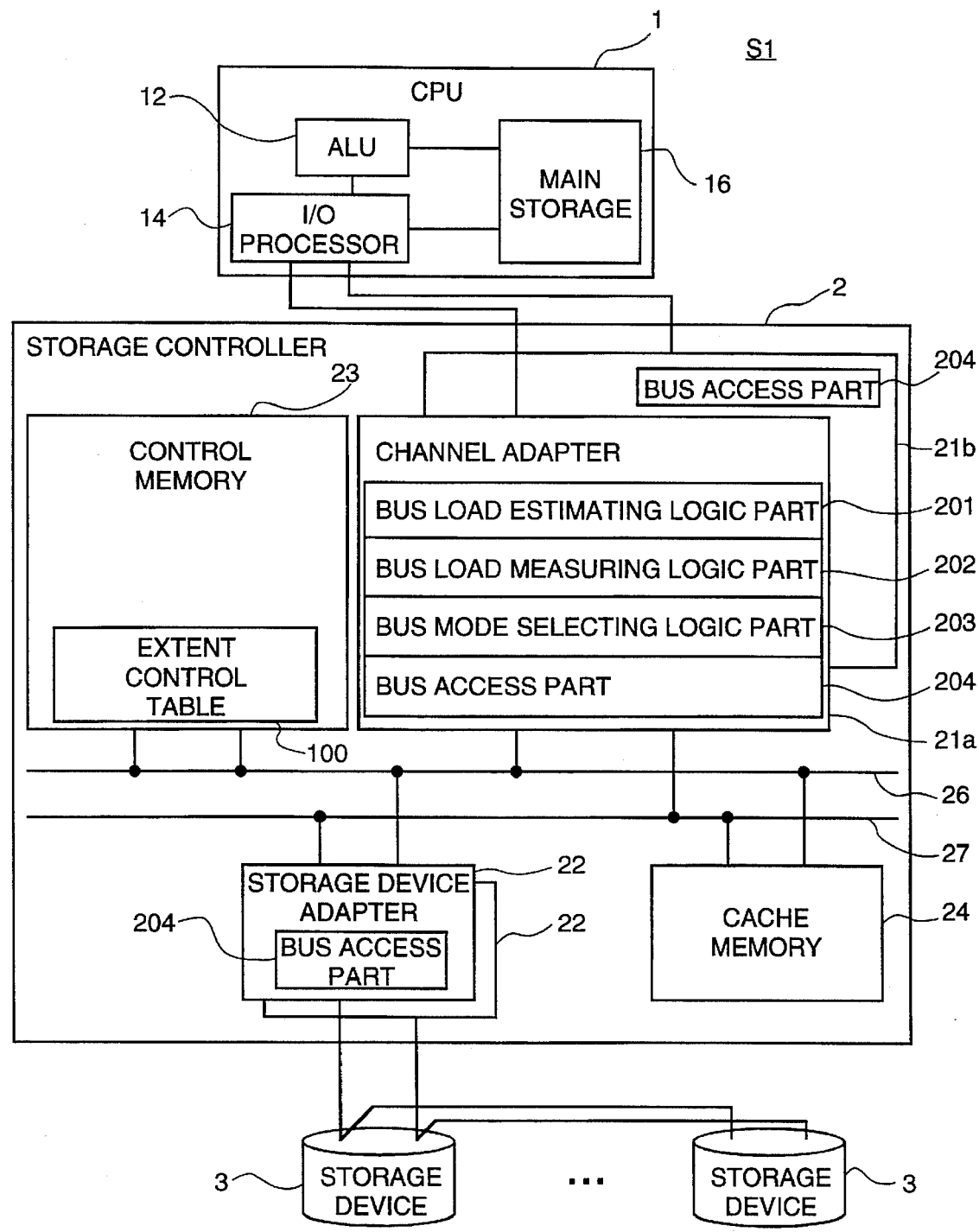
FIG. 1 is a schematic block diagram of a computer system including a storage controller according to a first embodiment of the invention.

FIG. 1 is a schematic block diagram of a computer system S1 including a storage controller 2 of an arrangement according to a first embodiment of the invention. In the computer system S1, a central processing unit (CPU) 1 is connected to a plurality of storage devices 3 via the storage controller 2. The CPU 1 comprises an arithmetic and logic unit (ALU) 12, a main storage 16 and an input/output processor 14. Application programs for online and batch processing run on the CPU 1. Data input/output requests issued by such application programs are transferred from the input/output processor 14 to the storage controller 2.

The storage controller 2 has a cache memory 24, channel adapters 21a and 21b, storage device adapters 22, a control memory 23, and buses 26 and 27. The cache memory 24 accommodates part of the data held in the storage devices 3 according to a preferred embodiment of the invention. Alternatively, cache memory 24 may be replaced by other memory according to the requirements of the controller. The channel adapters 21a and 21b control data transfer between the CPU 1 and the cache memory 24. The channel adapter 21a includes a bus load estimating logic part 201 for estimating the bus load, a bus load measuring logic part 202 for measuring the bus activity ratio, a bus mode selecting logic part 203 for determining the mode of bus utilization, and a bus access part 204 for gaining access to a bus. The channel adapter 21b also has a function equivalent to the bus access part 204. The storage device adapters 22 control data transfer between the storage devices 3 and the cache memory 24. The control memory 23 stores bus control information, storage device control information, cache control information, and an extent control table 100 to be described later. The bus 26 and the bus 27 constitute a duplex common bus arrangement.

Figure 2:
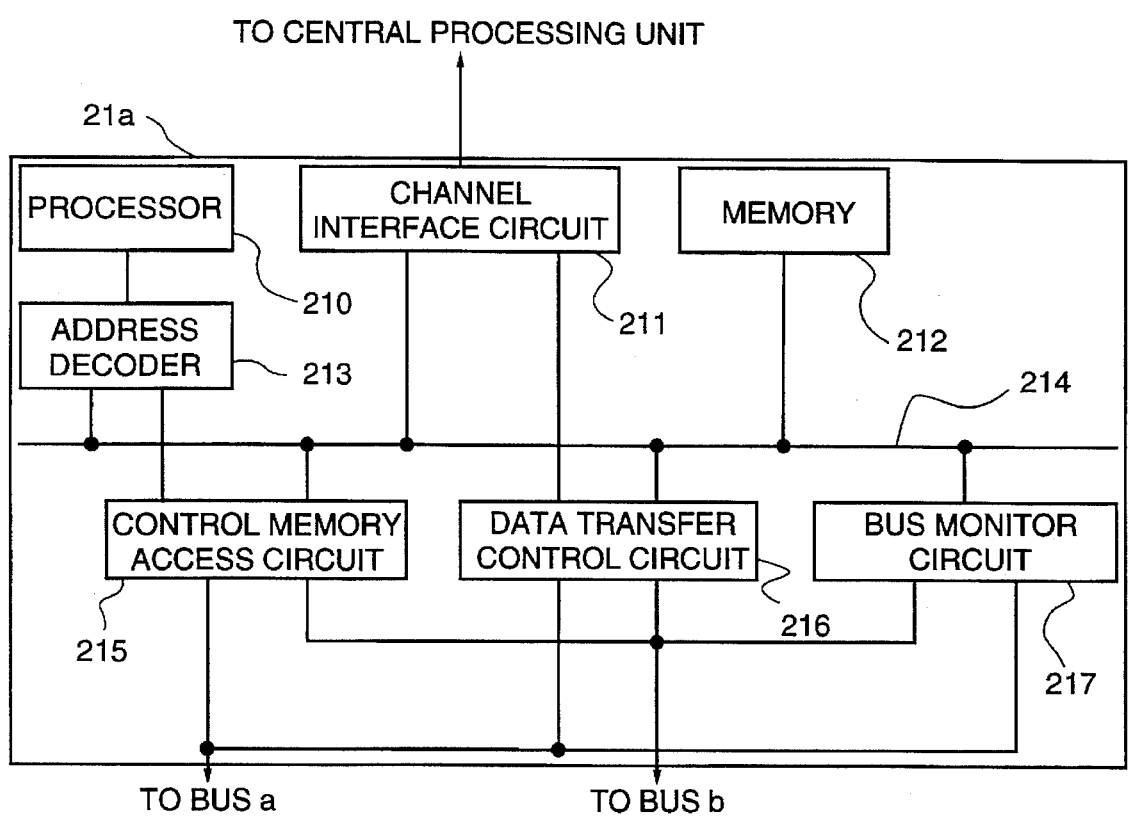
FIG. 2 is a block diagram showing the internal arrangement of a channel adapter according to the first embodiment.

FIG. 2 is a block diagram showing the internal arrangement of the channel adapter 21a. The channel adapter 21a includes a processor 210, a memory 212, an address decoder 213, a channel interface circuit 211, a control memory access circuit 215, a data transfer control circuit 216, a bus monitor circuit 217 and an internal bus 214. The processor 210 provides overall control of the channel adapter operation. The memory 212 stores programs executed by the processor 210 and other resources used by the processor 210. The address decoder 213 decodes the addresses to be controlled by the processor 210. The channel interface circuit 211 interfaces to the CPU 1. The control memory access circuit 215 accesses the control memory 23 via the bus 26 or the bus 27. The data transfer control circuit 216 incorporating a DMA circuit controls data transfer between the CPU 1 and the cache memory 24 via the bus 26 or 27. The bus monitor circuit 217 measures the activity ratio of the bus 26 and the bus 27 per unit time. The channel adapter 21b has approximately the same constitution as the channel adapter 21a.

Figure 3:
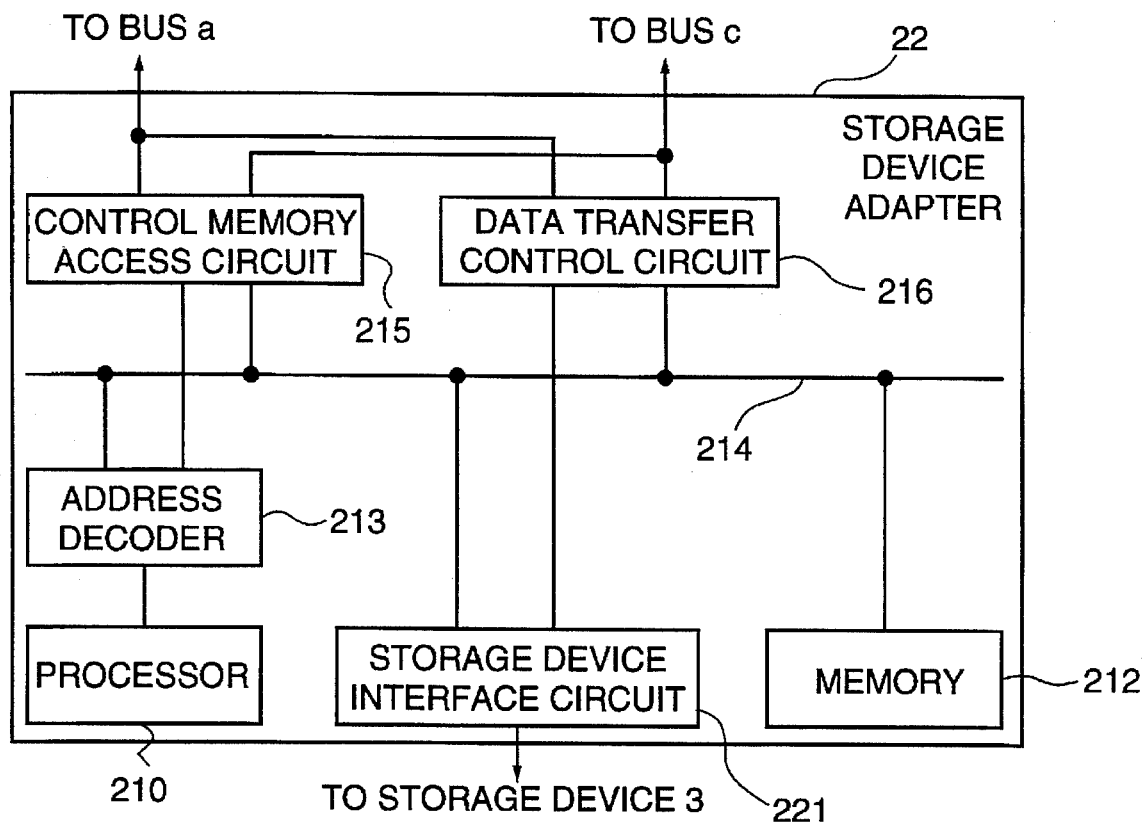
FIG. 3 is a block diagram depicting the internal arrangement of a storage device adapter according to the first embodiment.

FIG. 3 is a block diagram depicting the internal constitution of the storage device adapter 22. The storage device adapter 22 comprises a processor 210, a memory 212, an address decoder 213, a storage device interface circuit 221, a control memory access circuit 215, a data transfer control circuit 216, and an internal bus 214. Of these component parts, the processor 210, memory 210, address decoder 213, control memory access circuit 215 and internal bus 214 are the same as those of the channel adapter 21a. The storage device interface circuit 221 interfaces to the storage devices 3.

During operation of the system, the CPU 1 executes application programs. When it is necessary to write or read data to or from the storage devices 3, the CPU 1 loads a channel program into the main storage 16 and issues an input/output start instruction to start the input/output processor 14. The input/output processor 14 thus started executes the channel program in the main storage 16.

Figure 4:
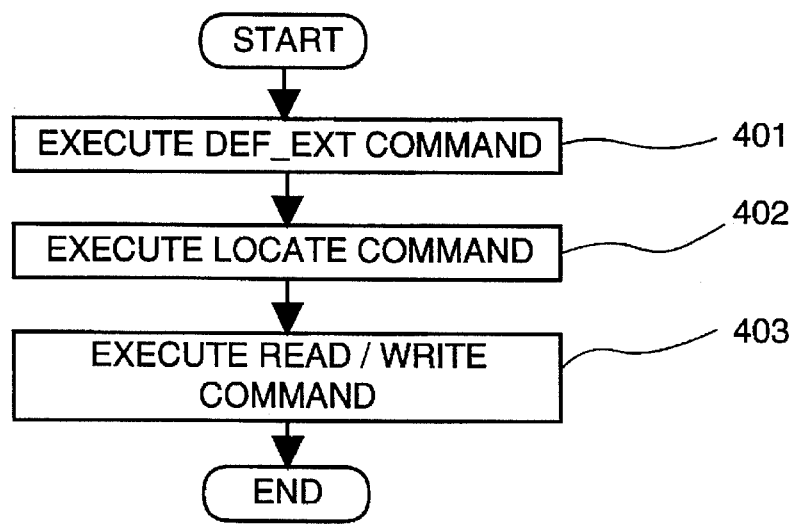
FIG. 4 is a flowchart of steps outlining the processing of the channel program performed by the input/output processor of the first embodiment.
Figure 5:
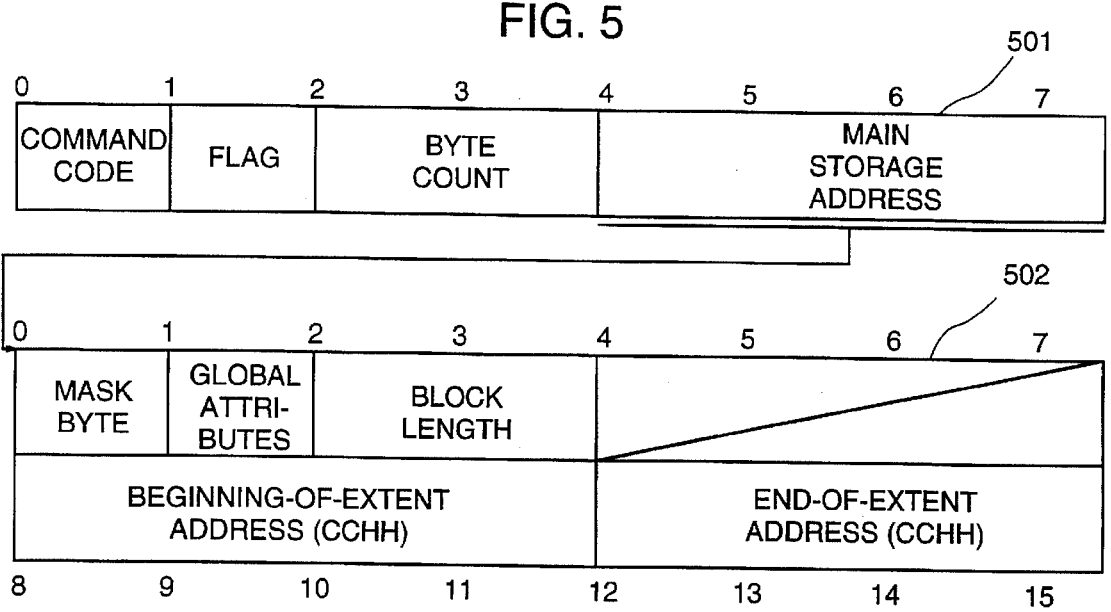
FIG. 5 is a view showing the format of a DEF_EXT command.

FIG. 4. In step 401, the input/output processor 14 executes a DEF_EXT command designating the extent in the storage device 3 to or from which the data is to be written or read. As shown in FIG. 5, the format of the DEF_EXT command is composed of a CCW (channel command word) 501 describing the content of the command, and a parameter 502 held in that extent of the main storage 16 which is pointed to by the main storage address held in the CCW 501. The CCW 501 has a command code, a flag, a byte count and the main storage address. The parameter 502 has a mask byte, global attributes, a block length, a beginning-of-extent address and an end-of-extent address. The mask byte designates the type of CCWs that may be specified by subsequent CCWs. The global attributes designate how a disk cache is to be used and whether the current input/output request is a sequential access data transfer request. The block length designates the number of bytes to be transferred in a single record where the target file for the input/output operation comprises equal-length records. Executing the DEF_EXT command transfers the command code and the parameter 502 to the storage controller 2. If the received command code and parameter 502 are found to have no conflict therebetween, the storage controller 2 acknowledges a normal end of this DEF_EXT command to the CPU 1.

Figure 6:
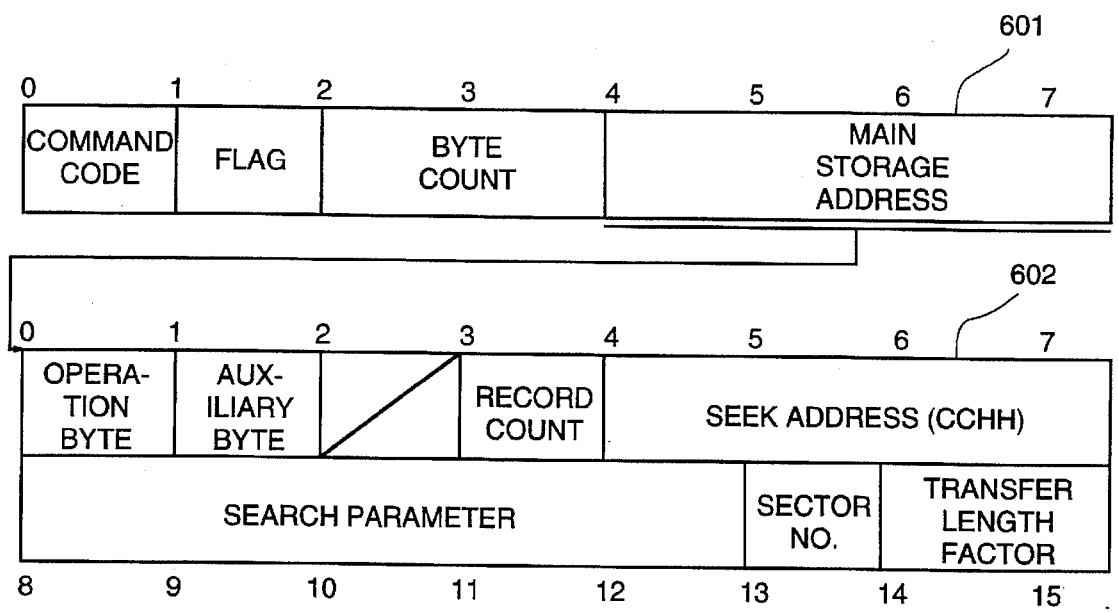
FIG. 6 is a view depicting the format of a LOCATE command.

In step 402, on receiving the normal end acknowledgment of the DEF_EXT command, the input/output processor 14 executes a LOCATE command. As shown in FIG. 6, the LOCATE command comprises a CCW 601 and a parameter 602 that designates information for locating the record to be processed by the storage controller 2 (i.e., information for positioning the magnetic head) as well as the number of records. The CCW 601 has a command code, a flag, a byte count and a main storage address. The parameter 602 has an operation byte, an auxiliary byte, a record count, a seek address, a search parameter, a sector number and a transfer length factor. Executing the LOCATE command transfers the command code and the parameter 602 to the storage controller 2. If the received command code and parameter 602 are found to have no conflict therebetween, the storage controller 2 acknowledges a normal end of the LOCATE command to the CPU 1.

Figure 7:
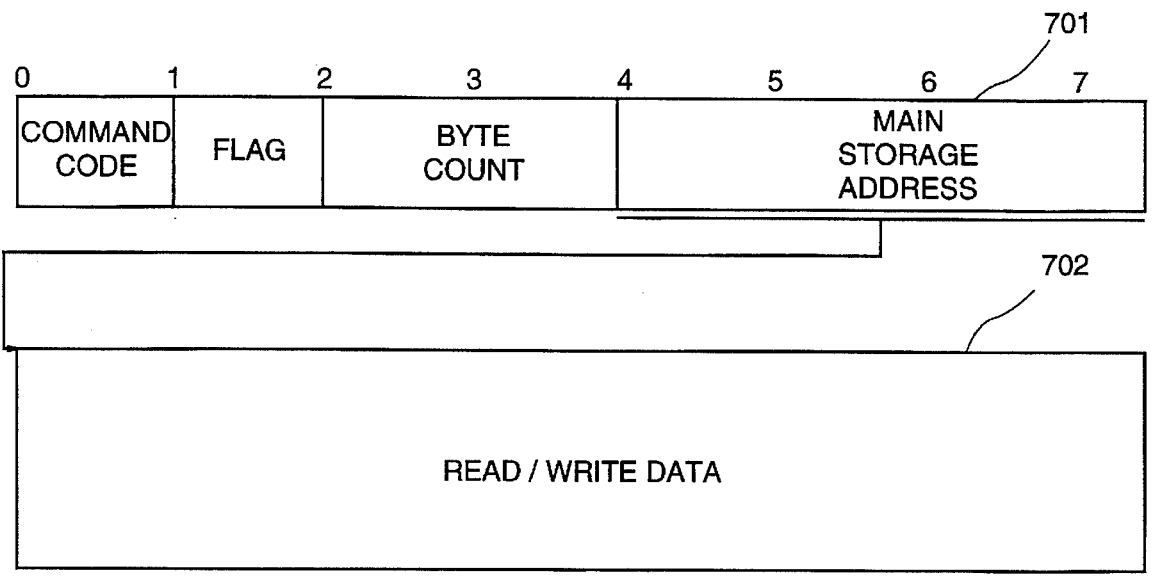
FIG. 7 is a view indicating the format of a READ/WRITE command.

In step 403, upon receipt of the normal end acknowledgment of the LOCATE command, the input/output processor 14 executes a READ/WRITE command (i.e., either a READ command or a WRITE command). As depicted in FIG. 7, the READ/WRITE command comprises a CCW 701 and the READ/WRITE data extent 702 in the main storage 16 which is pointed to by the main storage address in the CCW 701. The CCW 701 has a command code, a flag, a byte count and the main storage address. When the READ command is executed, data transferred from the storage controller 2 is stored into the READ/WRITE data extent 702. When the WRITE command is executed, the READ/WRITE data extent 702 accommodates data to be transferred to the storage controller 2. Executing the READ command transfers the command code to the storage controller 2. In response, the storage controller 2 transfers to the input/output processor 14 the data of the record designated by the LOCATE command. The input/output processor 14 places into the READ/WRITE data extent 702 the data transferred from the storage controller 2. On the other hand, executing the WRITE command transfers the command code and the data from the READ/WRITE data extent 702 to the storage controller 2. In response, the storage controller 2 writes the data to the record extent designated by the LOCATE command.

As described, the input/output processor 14 processes the input/output request using the DEF_EXT command, LOCATE command and READ/WRITE command. The CCWs in these commands constitute a series called a command chain.

The storage controller 2, upon receiving the command chain from the input/output processor 14 of the CPU 1 through the channel adapter 21a (or 21b) of the storage controller 2 references the storage device control information in the control memory 23. In so doing, the channel adapter 21a checks to see if the target storage device 3 for the input/output operation is busy. If the storage device 3 in question is not busy, the channel adapter 21a sets a busy flag in the storage device control information and acquires permission to use the storage devices 3. There are two kinds of permission to use the storage devices 3: one for the use of the channel adapter 21a (or 21b), and the other for the use of the storage device adapter 22. The former permission is called access permission of a logical storage device, and the latter, access permission of a physical storage device.

If the storage device 3 in question is found to be busy at step 411, the channel adapter 21a notifies the input/output processor 14 of the CPU 1 that the target storage device 3 is busy and is not available for execution of the current input/output request. On acquiring access permission of a logical storage device, the channel adapter 21a (or 21b) references the cache control information held in the control memory 23 and checks to see if the cache memory 24 contains the record designated by the LOCATE command. If the record in question does not exist in the cache memory 24, the channel adapter 21a requests the storage device adapter 22 to place the record in question into the cache memory 24 via the control memory 23, and halts the processing of the current command chain. The channel adapter 21a then stores in the control memory 23 information that will allow the channel adapter 21a or 21b subsequently to resume the processing of the command chain.

The storage device adapter 22 reads from the control memory 23 the request coming from the channel adapter 21. Thereafter, the storage device adapter 22 accesses the storage device control information in the control memory 23 to acquire access permission of a physical storage device with respect to the storage devices 3. With the permission acquired, the storage device adapter 22 accesses the cache control information in the control memory 23 in order to secure in the cache memory 24 an extent into which the record is to be read from the storage device 3. After this, the storage device adapter 22 issues a record read request to the storage device 3. In response to the record read request thus issued, the storage device 3 reads the record in question and transfers it to the storage device adapter 22 of the storage controller 2. The storage device adapter 22 places the transferred record into the cache memory 24. Thereafter, the storage device adapter 22 notifies the channel adapter 21a (or 21b) via the control memory 23 that the reading of the target record for the input/output operation into the cache memory 24 has been completed.

On reading the read end notice from the control memory 23, the channel adapter 21a (or 21b) reads from the control memory 23 information for resuming the processing of the command chain, and resumes the processing. Thereafter the channel adapter 21b transfers to the CPU 1 the record held in the cache memory 24.

In the storage controller 2, control data transfer and data transfer between the channel adapters 21a, 21b and storage device adapters 22, and the control memory 23 and cache memory 24 are carried out over the bus 26 or the bus 27. The utilization mode of the bus 26 or the bus 27 is controlled dynamically by a bus control function in keeping with the status changes of the input/output requests. That bus control function will now be described.

The bus control function is implemented by use of the bus load estimating logic part 201, bus load measuring logic part 202, bus mode selecting logic part 203 and bus access part 204 operating as part of the channel adapter 21a; and of the bus access part 204 operating as part of the channel adapter 21b and storage device adapter 22.

Figure 8:
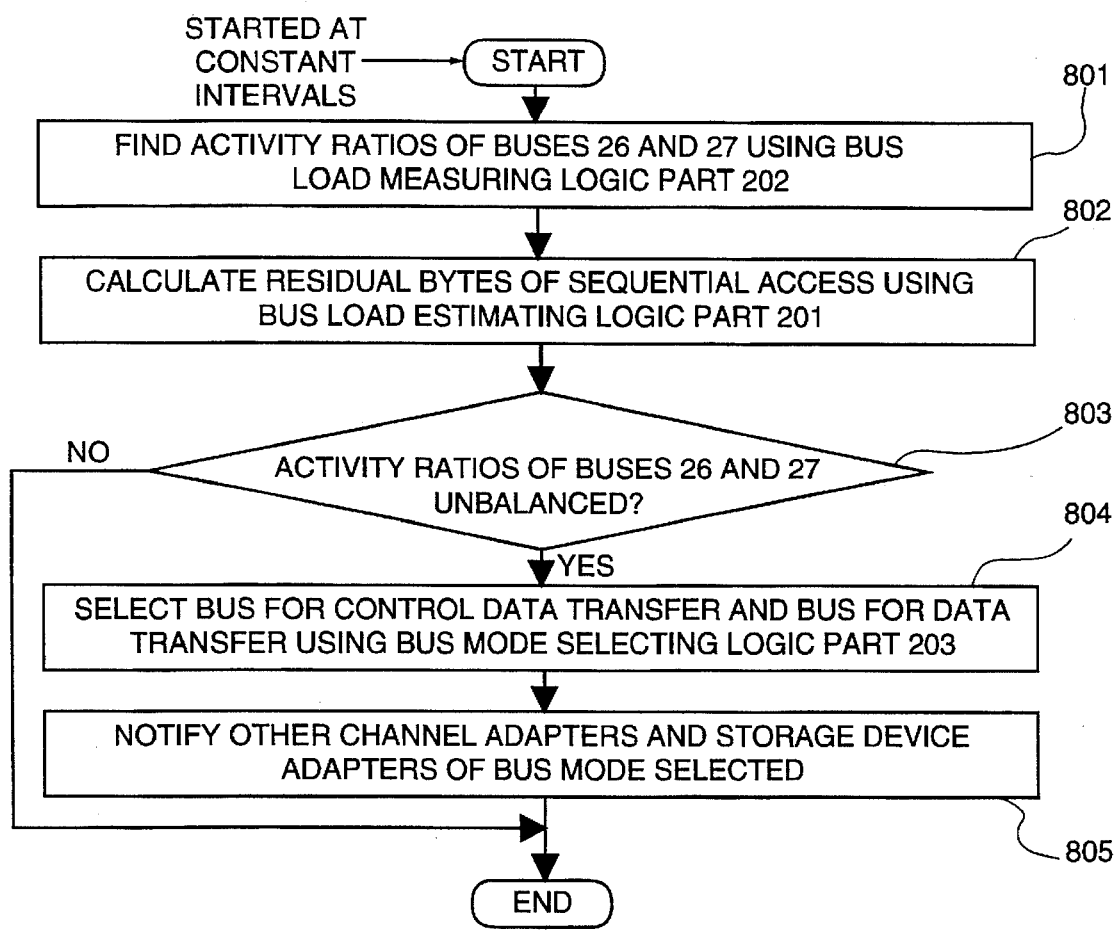
FIG. 8 is a flowchart of steps outlining the processing of the bus control function executed by the channel adapter.
Figure 9:
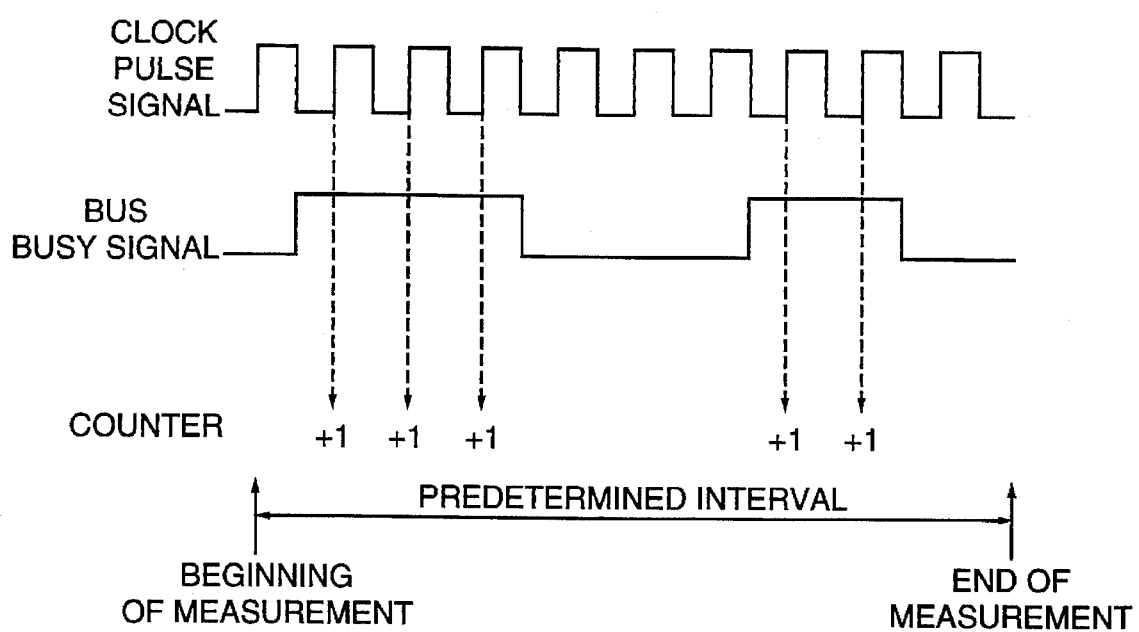
FIG. 9 is a view illustrating the principles by which the bus monitor circuit of the first embodiment measures the bus activity ratio.

FIG. 8 is a flowchart outlining the processing of the bus control function executed by the channel adapter 21a. This bus control function is activated at predetermined intervals. In step 801, the bus load measuring logic part 202 obtains the activity ratio of each of the buses 26 and bus 27. Specifically, as shown in FIG. 9, the bus monitor circuit 217 of the channel adapter 21a monitors a bus busy signal for each of the buses 26 27 at leading edges of a clock pulse signal. If a given bus is found to be busy, an internal counter corresponding to the bus 26 or the bus 27 is incremented by 1. While step 801 is being executed, the value of each of the internal counters is read and the counter value is divided by the number of clock pulses within one predetermined unit period. This gives the activity ratio of each of the buses. After its value is read out, each internal counter is cleared. In the example of FIG. 9, the number of clock pulses in the unit period is 10 and the value read from the internal counter is 5. Thus the bus activity ratio is 50%.

In step 802, the bus load estimating logic part 201 calculates the residual bytes of sequential access as the index for estimating the bus load characteristic. The residual bytes of sequential access can be obtained by referencing the extent control tables 100 held in the control memory 23. The residual bytes of sequential access are used as the index for estimating the bus load characteristic for the following reasons.

There are two patterns of access to the storage devices 3: sequential access and random access. Sequential access is the access pattern involving the sequential reading or writing of data from the beginning of a file. Sequential access is generally used in batch processing involving large quantities of data transfer, i.e., in dealing with a large proportion of data transfer bus load. On the other hand, random access is an access pattern involving the random writing or reading of data to or from any location in a file. Random access is generally used in online processing involving small quantities of data transfer and hence involving a large proportion of control data transfer bus load. Thus the greater the residual bytes of sequential access, the higher the estimated proportion of data transfer load; the smaller the residual bytes of sequential access, the higher the estimated proportion of control data transfer load.

Step 803 determines whether the activity ratio of the bus 26 and that of the bus 27 are unbalanced. A criterion for this determination can be decided optionally. Illustratively, if the activity ratio of one bus is 70% or higher and that of the other bus is less than 30%, the unbalance in activity ratio is recognized between the buses. If the activity ratios are unbalanced, step 804 is reached; if the activity ratios are balanced, the processing is terminated because the current mode of bus utilization is appropriate. In step 804, the bus mode selecting logic part 203 carries out a bus mode selecting process. That is, the part 203 determines the mode in which to utilize each of the buses 26 and 27 on the basis of the bus activity ratios obtained in step 801 and of the residual amount of sequential access acquired in step 802. As shown in FIG. 10, there are three bus modes in which to utilize the buses as follows.

Normal Mode.

This is a bus mode in which the system is started. In this mode, the bus 26 is used for control data transfer (i.e., as the dedicated bus for access to the control memory 23) and the bus 27 for data transfer (as the dedicated bus for access to the cache memory 24).

Sequential Access Mode.

This is a bus mode selected when the input/output requests issued by the CPU 1 involve more sequential access than random access. In the sequential access mode, the bus 26 is used for both control data transfer and data transfer, and the bus 27 for data transfer.

Random Access Mode.

This is a bus mode selected when the input/output requests issued by the CPU 1 involve more random access than sequential access. In the random access mode, the bus 26 is used for control data transfer and the bus 27 for control data transfer and data transfer.

In step 805, the channel adapter 21a notifies all channel adapters 21b and storage device adapters 22 inside the storage controller 2 of the bus utilization mode selected in the preceding step 804. On the basis of the bus utilization mode notified, the bus access part 204 operating in each adapter sets the appropriate buses for the control memory access circuit 215 and data transfer control circuit 216. With this setting accomplished, the control memory access circuit 215 utilizes the bus 26 alone for control data transfer when the bus mode is in the sequential mode or normal mode; and the control memory access circuit 215 utilizes both the bus 26 and the bus 27 for control data transfer when the bus mode is in the random mode. Meanwhile, the data transfer control circuit 212 uses the bus 27 alone for data transfer when the bus mode is random mode or normal mode; and the data transfer control circuit 212 uses both the bus 27 and the bus 26 for data transfer when the bus mode is in the sequential mode.

Figure 11:
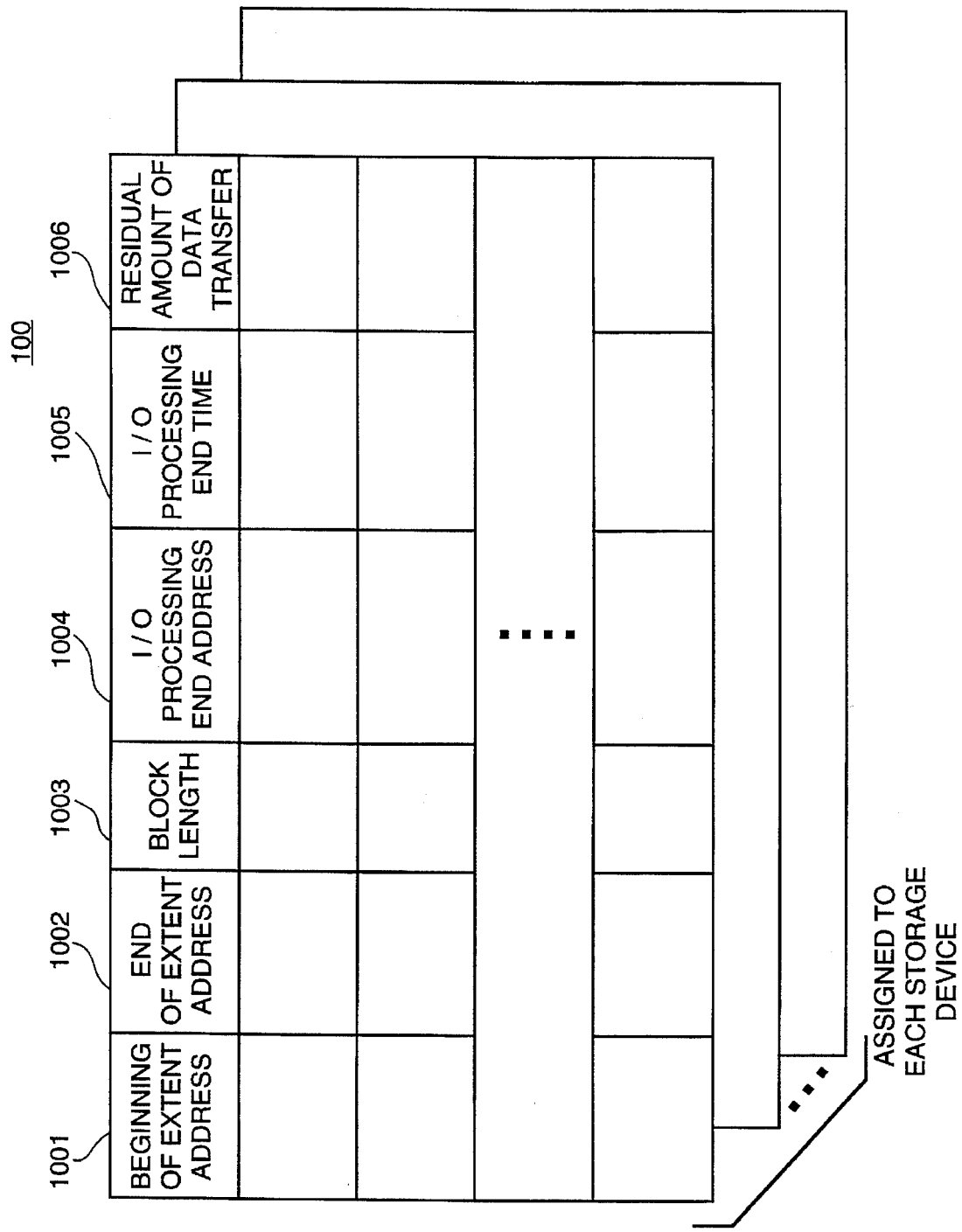
FIG. 11 is a view depicting the structure of the extent control tables for use with the system of the first embodiment.

FIG. 11 is a view depicting the structure of the extent control tables 100 which are used to obtain the residual bytes of sequential access in the step 802. One extent control table 100 is assigned to each of the storage devices 3. The extent control table 100 has entries corresponding to the file extents to or from which to write or read data as designated by the command chain issued by the CPU 1. Each entry comprises the following fields:

Beginning-of-extent address 1001

Indicates the start address of each extent in the target file for the input/output operation.

End-of-extent address 1002

Indicates the end address of each extent in the target file for the input/output operation.

Block length 1003

Indicates the length of data in each record of the target file for the input/output operation.

Input/output processing end address 1004

Indicates the address of the record immediately after the record accessed by the command chain last issued by the CPU 1.

Input/output processing end time 1005

Indicates the time at which the processing of the command chain last issued by the CPU 1 ended.

Residual amount of data transfer 1006

Figure 12:
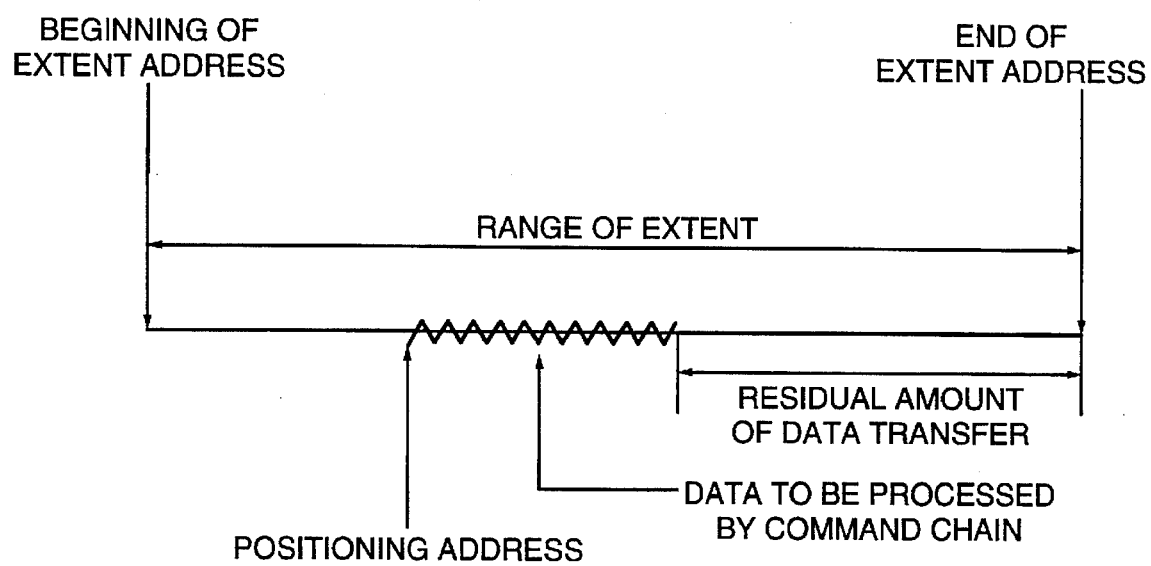
FIG. 12 is a view illustrating the principles by which the residual amount of data transfer is calculated.

Indicates the residual amount of data transfer. As shown in FIG. 12, the residual amount of data transfer is the amount of data ranging from a first to a second record, the first record being the one immediately after the record processed by the command chain last issued by the CPU 1 with respect to the extent in question, the second record being the one having the end-of-extent address.

Figure 13:
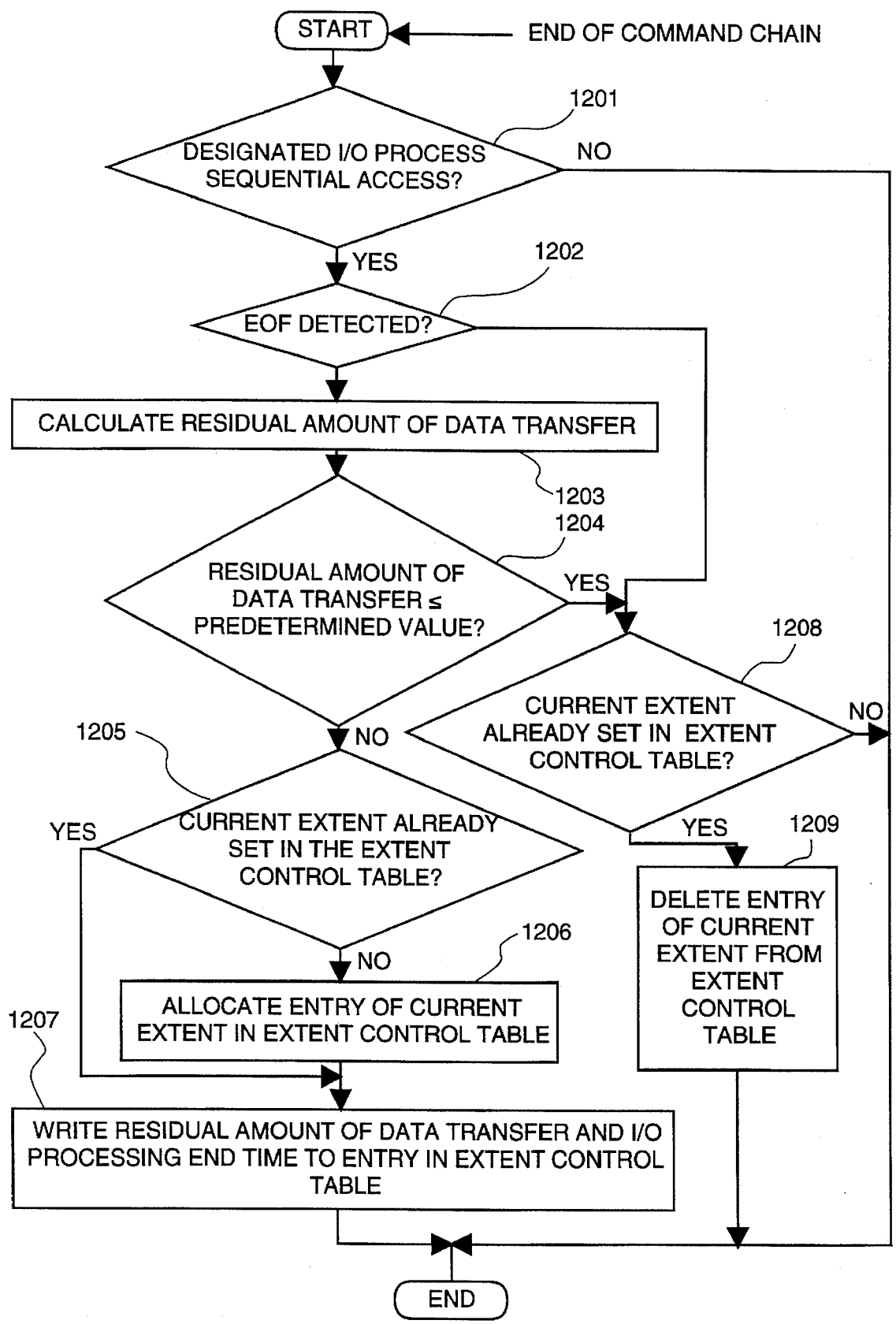
FIG. 13 is a flowchart of the process of storing data into the extent control table of the first embodiment.

FIG. 13 is a flowchart of the process of storing data into the extent control table 100. This process is executed by the processor 210 of the channel adapter 21a upon completion of the processing of the command chain issued by the CPU 1. In step 1201, a check is made to see if the input/output processing designated by the current command chain with respect to the storage devices 3 is a sequential access operation. If the input/output processing is found to be a sequential access operation, step 1202 is reached. If the input/output process is found not to be a sequential access operation, the process of storing data into the extent control table 100 comes to an end. The judgment on the input/output processing is made by referencing the sequential access flag set in the global attributes of the parameter 502 in the DEF_EXT command designated at the beginning of the command chain. At the time the command in question is received, the parameter 502 is stored in the control memory 23. In step 1202, a check is made to see if an EOF (end of file) indicating the end of the extent is detected during the current input/output processing. If the EOF is not detected, step 1203 is reached; if the EOF has been detected, step 1208 is reached. In step 1203, the residual amount of data transfer is calculated. Specifically, as shown in FIG. 11, the amount of data ranging from a first to a second record is calculated, the first record being the one immediately after the record whose address is designated by the LOCATE command last issued by the CPU 1 with respect to the extent in question, and the second record being the one having the end-of-extent address. In step 1204, a check is made to see if:

residual amount of data transfer
≦predetermined value (e.g., 16 KB)

since the bus load is considered equivalent to that of random access where the input/output processing of sequential access involves a sufficiently low amount of data transfer. If the above condition is not met, step 1205 is reached; if the condition is met, step 1208 is reached. In step 1205, a check is made to see if the entry corresponding to the current extent is already placed in the extent control table 100. If the entry in question is not found in the table 100, step 1206 is reached; if the entry is found to exist in the table 100, step 1207 is reached. Step 1206 allocates in the extent control table 100 an entry for accommodating the current extent. Then the beginning-of-extent address field 1001, end-of-extent address field 1002 and block length field 1003 of the allocated entry are filled with appropriate values from the parameter 502 of the DEF_EXT command held in the control memory 23. In step 1207, appropriate values are written to the input/output processing end time field 1005 and to the residual amount of data transfer field 1006. This completes the process of data storage into the extent control table 100. In step 1208, a check is made to see if the entry corresponding to the current extent already exists in the extent control table 100. If the entry is found to exist in the table 100, step 1209 is reached; if the entry is not found in the table 100, the process of data storage into the extent control table 100 is terminated. In step 1209, the entry in question is deleted, and the process of data storage into the extent control table 100 is terminated.

The bus load estimating logic part 201 references the extent control table 100, and regards, as the residual bytes of sequential access, the sum of the residual amounts of data transfer 1006 of all entries. However, exceptions are made for extents that are not accessed longer than a predetermined period of time (e.g., 10 seconds) when the input/output processing end time 1005 of each entry is referenced in the extent control table 100. At this point, the entry corresponding to the extent not accessed longer than the predetermined period of time may be deleted.

Figure 14:
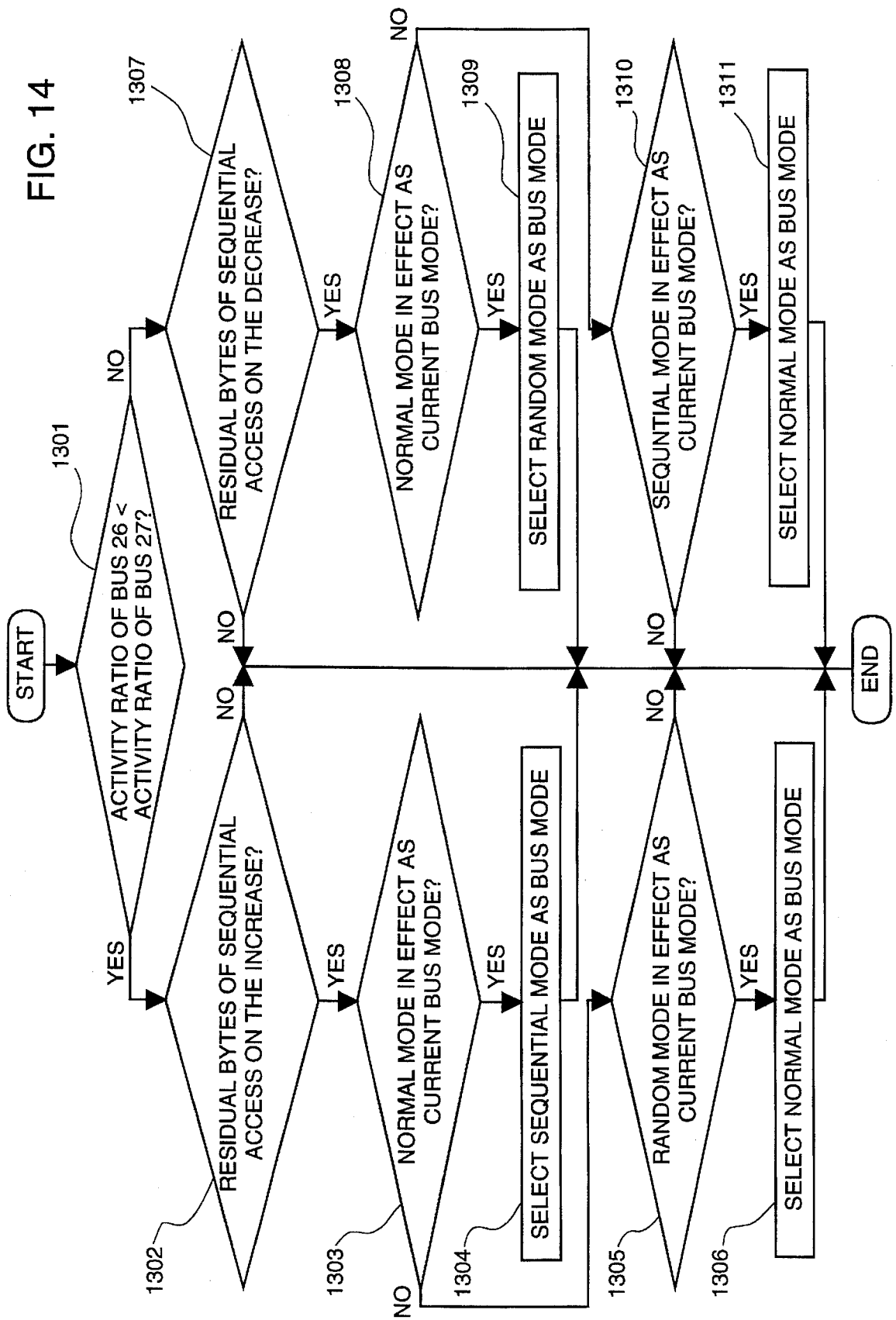
FIG. 14 is a flowchart of the bus mode selecting process of the first embodiment.

FIG. 14 is a flowchart of steps constituting the bus mode selecting process executed in the step 804. In step 1301, a check is made to see which activity ratio is the higher, that of the bus 26 or that of the bus 27. If the activity ratio of the bus 27 is higher than that of the bus 26, step 1302 is reached; if the activity ratio of the bus 26 is higher than that of the bus 27, step 1307 is reached. In step 1302, a check is made to see if the residual bytes of sequential access are on the increase. The judgment in step 1302 is made by comparing two kinds of residual bytes of sequential access. That is, the residual bytes of sequential access currently acquired are compared with those which were calculated by the bus control function activated previously and which are read from the control memory 23. If the current residual bytes of sequential access are found to be on the increase, step 1303 is reached; if the residual bytes are not found to be on the increase, the bus mode selecting process is terminated because there is no need to further enhance the current data transfer throughput. In step 1303, a check is made to see if the current bus mode is in the normal mode. If the current bus mode is found to be in the normal mode, step 1304 is reached; if the current bus mode is other than the normal mode, step 1305 is reached. In step 1304, sequential mode is selected as the bus mode. In this mode, bus 26 shares the load of data transfer so that the current data transfer throughput may be enhanced further. In step 1305, a check is made to see if the current bus mode is in the random mode. If the current bus mode is found to be in the random mode, step 1310 is reached; if the current bus mode is not the random mode, this means that the current bus mode is in the sequential mode. In the latter case, the bus mode selecting process is terminated because there is no other bus mode in which to further boost the current data transfer throughput. In step 1306, the normal mode is selected as the bus mode. In this mode, the current data transfer throughput is boosted further by dedicating the bus 27 to data transfer alone instead of letting it work as the bus for both control data transfer and data transfer. In step 1307, a check is made to see if the residual bytes of sequential access are on the decrease. If the residual bytes of sequential access are found to be on the decrease, step 1308 is reached; if the residual bytes of sequential access are found not to be on the decrease, the bus mode selecting process is terminated because there is no need to further boost the current control data transfer throughput. In step 1308, a check is made to see if the current bus mode is in the normal mode. If the current bus mode is found to be in the normal mode, step 1309 is reached; if the current bus mode is found not to be in the normal mode, step 1310 is reached. In step 1309, the random mode is selected as the bus mode. In the random mode, the bus 27 shares the load of control data transfer so that the current control data transfer throughput may be enhanced further. In step 1310, a check is made to see if the current bus mode is in the sequential mode. If the current bus mode is found to be in the sequential mode, step 1311 is reached; if the current bus mode is found not to be in the sequential mode, this means that the current bus mode is in the random mode. In the latter case, the bus mode selecting process is terminated because there is no other bus mode in which to further boost the current control data transfer throughput. In step 1311, the normal mode is selected as the bus mode. In this mode, the current control data transfer throughput is boosted further by dedicating the bus 26 to control data transfer alone instead of letting it work as the bus for both control data transfer and data transfer.

Figure 15:
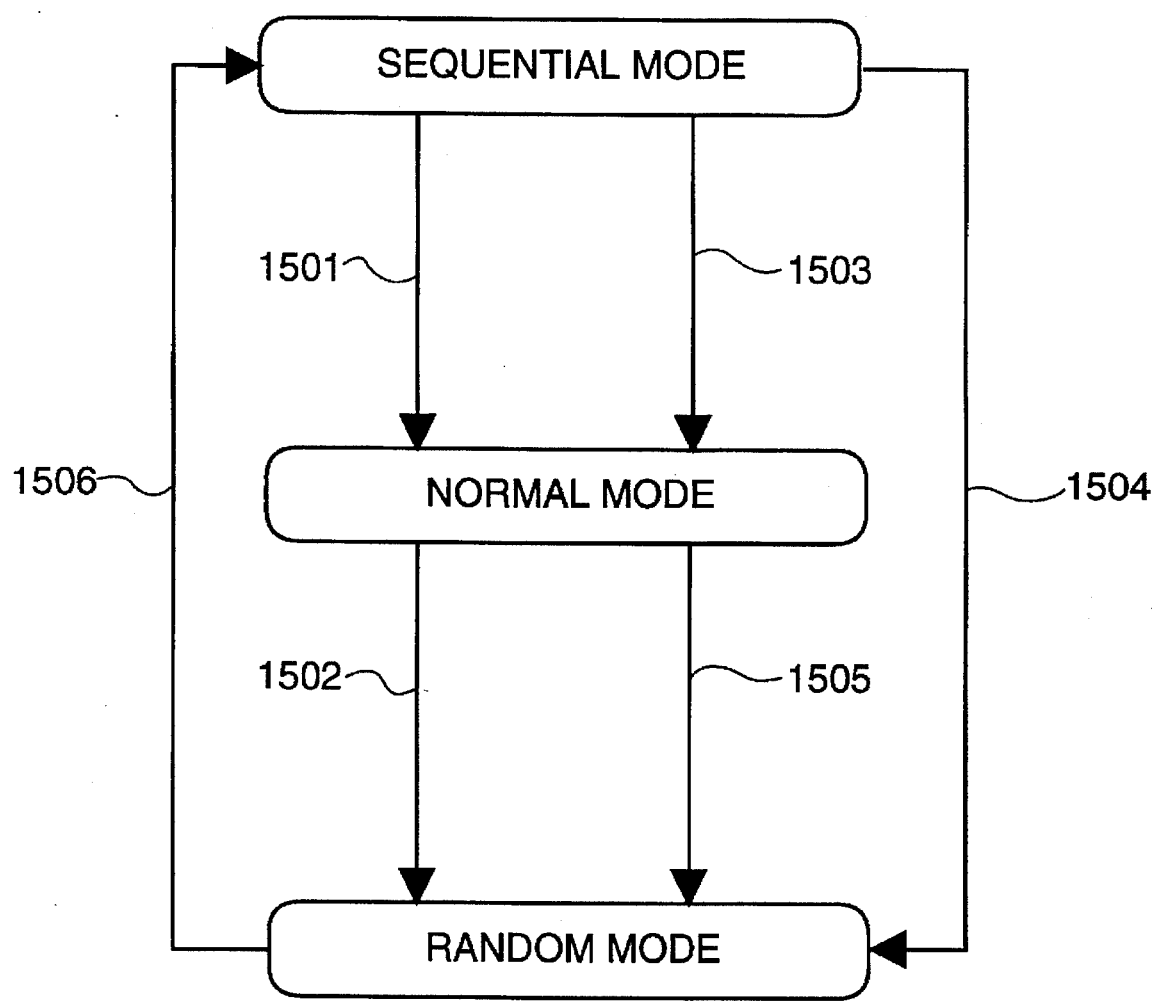
FIG. 15 is a bus mode transition diagram in connection with the first embodiment.

FIG. 15 is a bus mode transition diagram. FIG. 15 indicates the following bus mode transitions:

(1) Normal mode currently in effect is replaced by sequential mode if the activity ratio of the bus 27 becomes appreciably higher than that of the bus 26 and if the residual bytes of sequential access are on the increase (arrow 1501). The normal mode is also replaced by the sequential mode if the bus 27 fails in the former mode (arrow 1501). The normal mode is replaced by the random mode if the activity ratio of the bus 26 becomes considerably higher than that of the bus 27 and if the residual bytes of sequential access are on the decrease (arrow 1502). The normal mode is also replaced by the random mode if the bus 26 fails in the former mode (arrow 1502).

(2) The sequential mode currently in effect is replaced by the normal mode if the activity ratio of the bus 26 becomes significantly higher than that of the bus 27 and if the residual bytes of sequential access are on the decrease (arrow 1503). The sequential mode is also replaced by the random mode if the bus 26 fails in the former mode (arrow 1504).

(3) The random mode currently in effect is replaced by the normal mode if the activity ratio of the bus 27 becomes appreciably higher than that of the bus 26 and if the residual bytes of sequential access are on the increase (arrow 1505). The random mode is also replaced by the sequential mode if the bus 27 fails in the former mode (arrow 1506).

Where the transition of the bus modes is carried out as outlined above, the use modes of the bus 26 and the bus 27 are controlled dynamically in keeping with the changes in the operation mode of the computer system S1. In case of a failure on any bus, the use modes of the bus 26 and the bus 27 are controlled dynamically so as to let the storage controller 2 operate without interruption.

As described, the storage controller of the first embodiment of the invention permits changes of bus utilization modes in accordance with the characteristic changes in the input/output requests issued by the CPU. Specifically, in an input/output load environment involving more sequential access than random access, the storage controller selects the bus mode that emphasizes data transfer throughput. In an input/output load environment involving more random access than sequential access, the storage controller selects the bus mode that emphasizes control data transfer throughput. The first embodiment may illustratively be applied to a bank online processing system. During the day, the system deals with a relatively high proportion of online processing involving operations with automatic teller machines and thus operates in a bus mode emphasizing control data transfer throughput. At night, the system addresses a relatively high proportion of batch processing including credit settlement and thus operates in a bus mode emphasizing data transfer throughput. In this manner, the bank online processing system makes use of the common buses always in the optimal mode of bus utilization.

The storage controller of the first embodiment comprises two channel adapters and two storage device adapters. Alternatively, the storage controller may have any desired numbers of channel adapters and storage device adapters.

Figure 16:
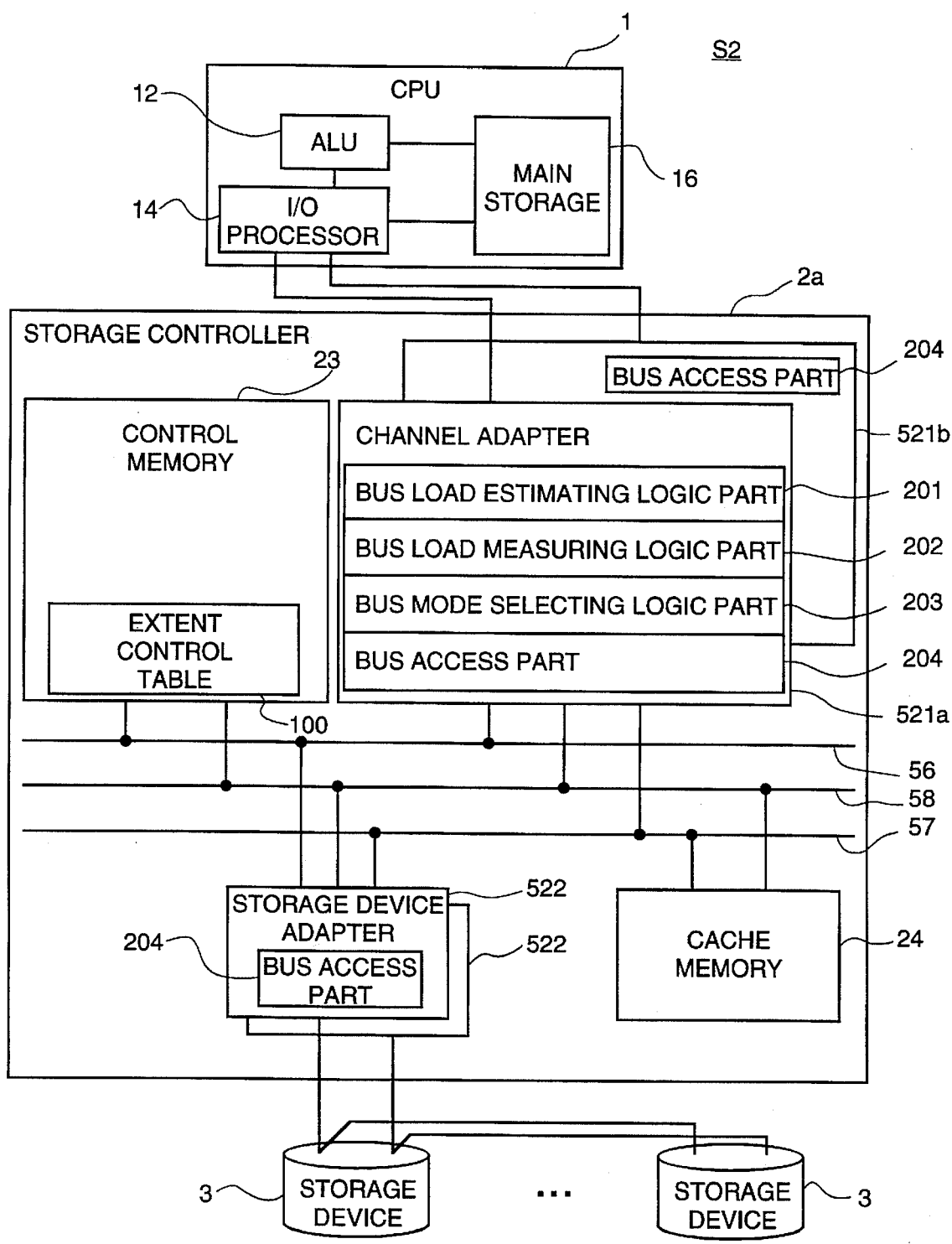
FIG. 16 is a schematic block diagram of a computer system including a storage controller practiced according to a second embodiment of the invention.

FIG. 16 is a schematic block diagram of a computer system S2 including a storage controller 2a constructed according to a second embodiment of the invention. The difference between the computer system S2 and the computer system S1 comprising the first embodiment lies in the common bus arrangement and bus modes. The common bus arrangement of the computer system S2 comprises three buses: bus 56, bus 57 and bus 58. The bus 56 is connected to channel adapters 521a and 521b, to storage device adapters 522 and to a control memory 23. The bus 57 is connected to the channel adapters 521a and 521b, to the storage device adapters 522 and to a cache memory 24. The bus 58 is connected to the channel adapters 521a and 521b, to the storage device adapters 522, to the control memory 23 and to the cache memory 24. There are two bus modes, the sequential mode and the random mode, for the common buses. As shown in FIG. 17, where the sequential mode is in effect, the bus 56 is used for control data transfer and the bus 57 and the bus 58 are employed for data transfer. When the random mode is in effect, the bus 56 and the bus 58 are used for control data transfer and the bus 57 is utilized for data transfer.

Figure 18:
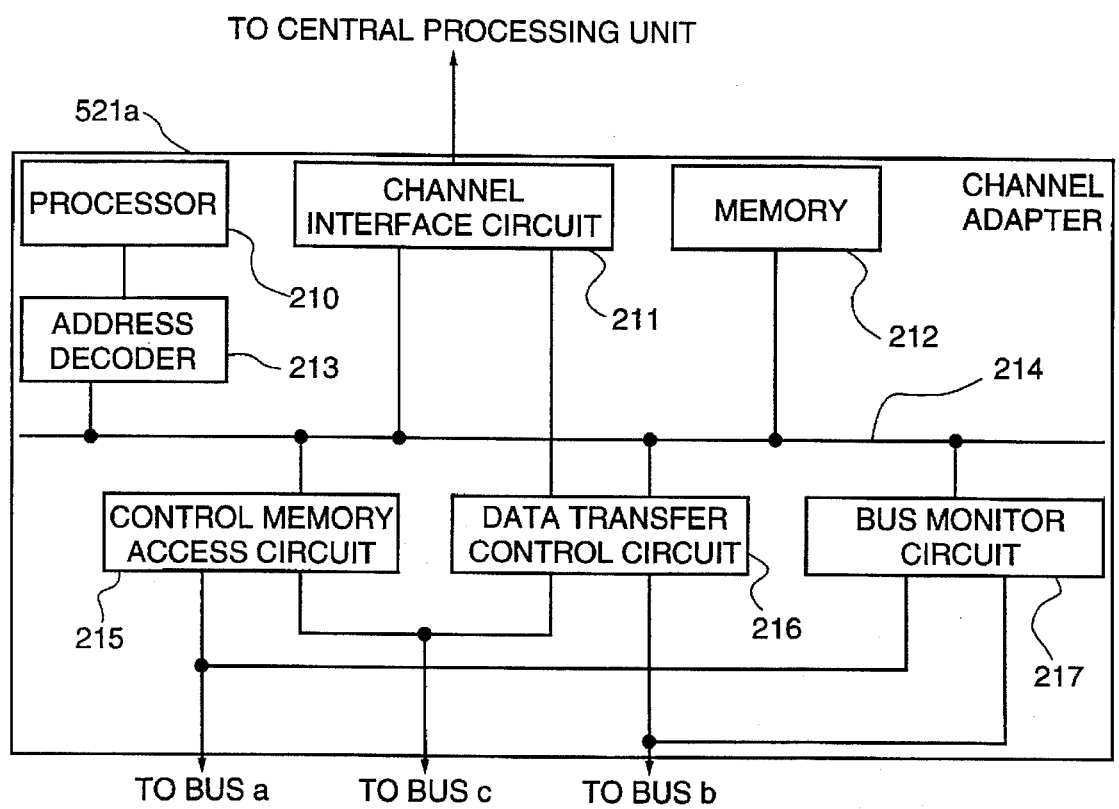
FIG. 18 is a block diagram showing the internal constitution of a channel adapter according to the second embodiment.

FIG. 18 is a block diagram showing the internal constitution of the channel adapter 521a. The difference between the channel adapter 521a and the channel adapter 21a of the first embodiment lies in the way the buses are connected to the control memory access circuit 215, data transfer control circuit 216 and bus monitor circuit 217. Specifically, the control memory access circuit 215 is connected to the buses 56 and 58; the data transfer control circuit 216 is connected to the bus 57 and the bus 58; the bus monitor circuit 217 is connected to the bus 56 and the bus 57.

Figure 19:
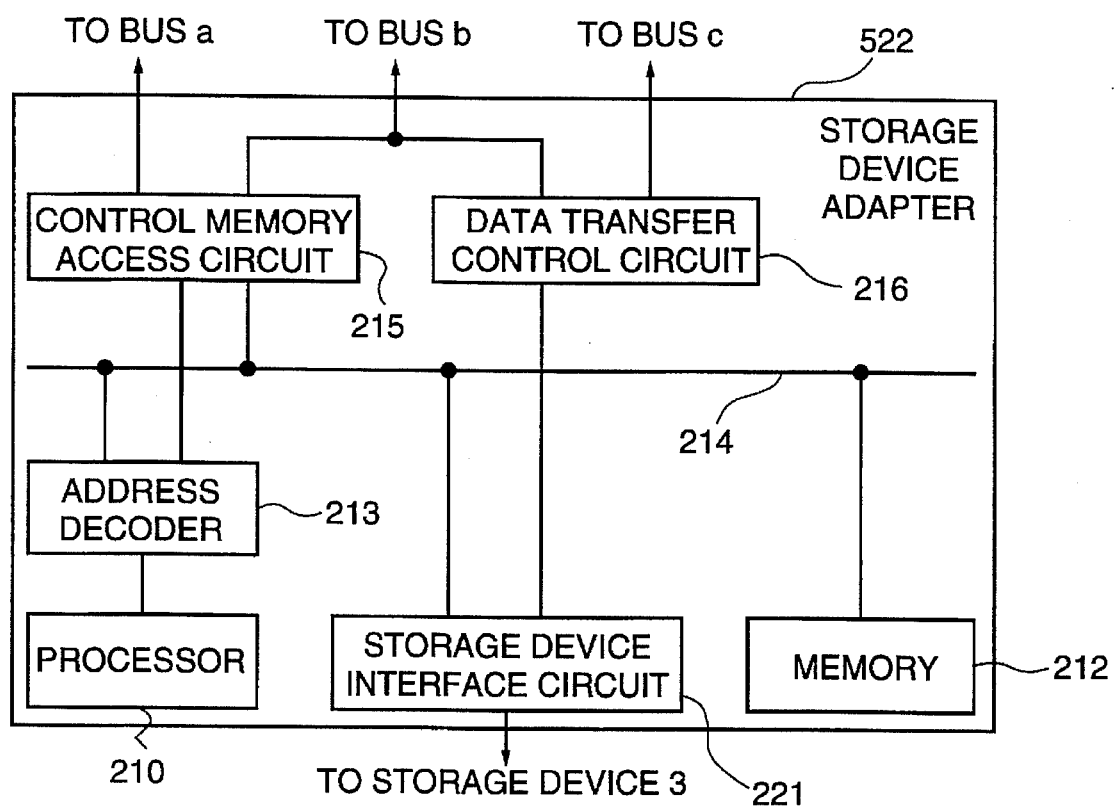
FIG. 19 is a block diagram depicting the internal arrangement of a storage device adapter according to the second embodiment.

FIG. 19 is a block diagram showing the internal constitution of the storage device adapter 522. The difference between the storage device adapter 522 and the storage device adapter 22 of the first embodiment lies in the way the buses are connected to the control memory access circuit 215 and data transfer control circuit 216. Specifically, the control memory access circuit 215 is connected to the bus 56 and the bus 58; the data transfer control circuit 216 is connected to the bus 57 and the bus 58.

The steps in which the channel program is executed by the input/output processor 14 of the CPU 1 are the same as those in FIG. 4 associated with the first embodiment. The steps in which the bus control function of the channel adapter 521a in the storage controller 2a are carried out are basically the same as those in FIG. 8. However, The bus mode selecting process executed in step 804 in FIG. 8 is different from that of the first embodiment shown in FIG. 14. The bus mode selecting process executed in step 804 for the second embodiment is shown in FIG. 20.

Figure 20:
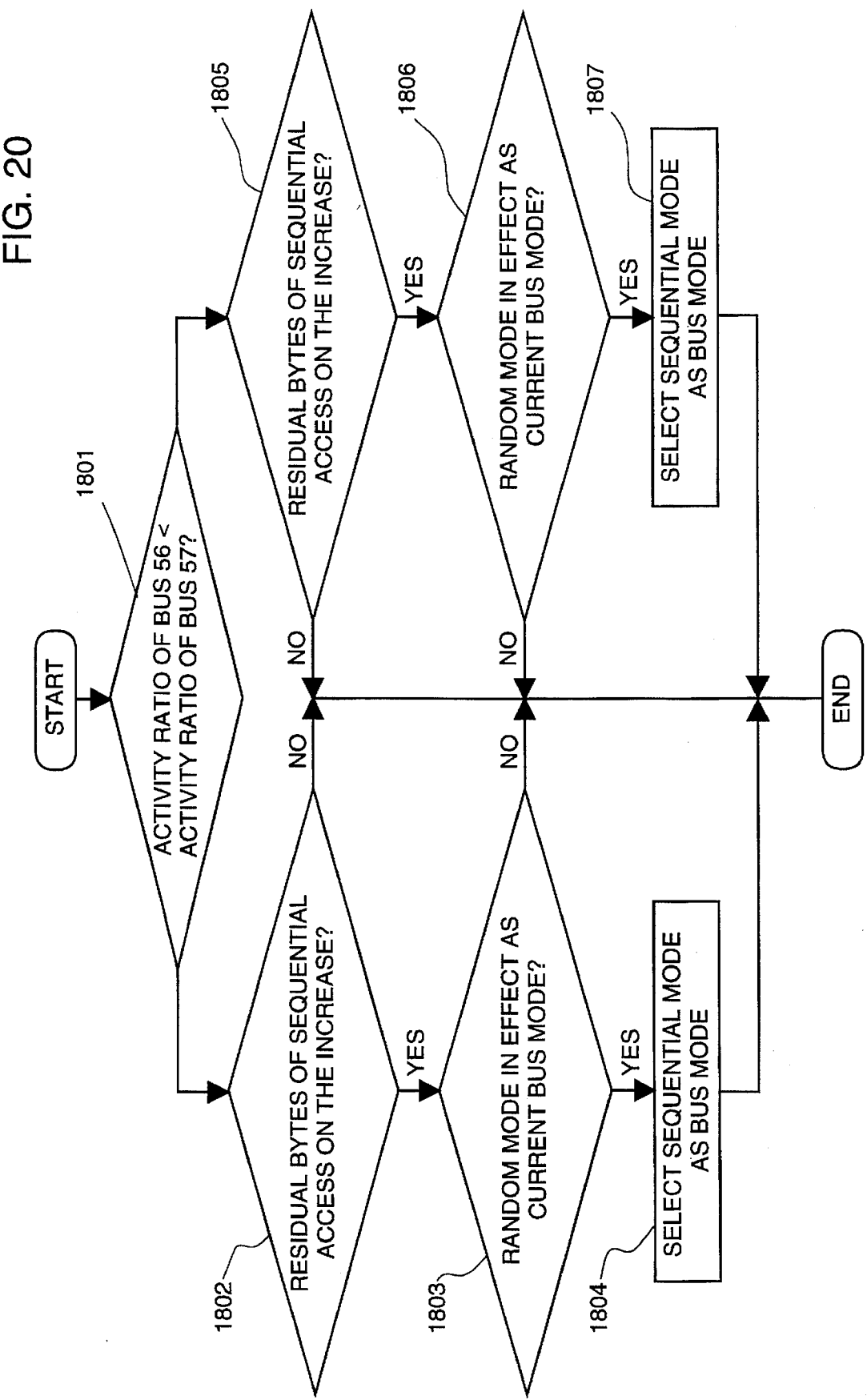
FIG. 20 is a flowchart of the bus mode selecting process according to the second embodiment.

In step 1801 of FIG. 20, a check is made to see which activity ratio is higher, that of the bus 56 or that of the bus 57. If the activity ratio of the bus 57 is higher than that of the bus 56, step 1802 is reached; if the activity ratio of the bus 56 is higher than that of the bus 57, step 1805 is reached. In step 1802, a check is made to see if the residual bytes of sequential access are on the increase. If the current residual bytes of sequential access are found to be on the increase, step 1803 is reached; if the residual bytes are found not to be on the increase, the bus mode selecting process is terminated because there is no need to enhance the current data transfer throughput any further. In step 1803, a check is made to see if the current bus mode is the random mode. If the current bus mode is found to be in the random mode, step 1804 is reached; if the current bus mode is not in the random mode, this means that the current bus mode is in the sequential mode. In the latter case, the bus mode selecting process is terminated because there is no other bus mode in which to boost the current data transfer throughput. In step 1804, the sequential mode is selected as the bus mode. In this mode, the bus 58 is used for data transfer so that the current data transfer throughput may be enhanced. In step 1805, a check is made to see if the residual bytes of sequential access are on the decrease. If the residual bytes of sequential access are found to be on the decrease, step 1806 is reached; if the residual bytes of sequential access are found not to be on the decrease, the bus mode selecting process is terminated because there is no need to further boost the current control data transfer throughput. In step 1806, a check is made to see if the current bus mode is in the sequential mode. If the current bus mode is found to be in the sequential mode, step 1807 is reached; if the current bus mode is found not to be in the sequential mode, this means that the current bus mode is in the random mode. In the latter case, the bus mode selecting process is terminated because there is no other bus mode in which the current control data transfer throughput would be further enhanced. In step 1807, the random mode is selected as the bus mode. In random mode, the bus 58 is used for control data transfer so that the current control data transfer throughput may be enhanced.

On the basis of the bus utilization mode that is determined, the bus access part 204 operating in each adapter sets the appropriate buses for the control memory access circuit 215 and data transfer control circuit 216. With this setting accomplished, the control memory access circuit 215 utilizes the bus 56 alone for control data transfer when the bus mode is in the sequential mode; the control memory access circuit 215 utilizes both the bus 56 and the bus 58 for control data transfer when the bus mode is in the random mode. Meanwhile, the data transfer control circuit 212 uses the bus 57 alone for data transfer when the bus mode is in the random mode; the data transfer control circuit 212 uses both the bus 57 and the bus 56 for data transfer when the bus mode is in the sequential mode.

In the case of a bus failure, the current bus mode in which the failure has occurred is replaced by one of the four modes shown in FIG. 21. This allows the storage controller 2a to operate continuously regardless of the failure on any of the buses configured. According to this embodiment, the following failure modes are available as shown in FIG. 21.

Bus 56 failure mode:

If the bus 56 has failed, the bus 57 is used for data transfer and bus 58 for control data transfer.

Bus 57 failure mode:

If the bus 57 has failed, the bus 56 is used for control data transfer and the bus 58 for data transfer.

Bus 58 failure mode:

If the bus 58 has failed, the bus 56 is used for control data transfer and the bus 57 for data transfer.

Bus 56/57 failure mode:

If the bus 56 and the bus 57 have both failed, the bus 58 is used for both control data transfer and data transfer.

As with the storage controller 2 practiced according to the first embodiment, the storage controller 2a according to the second embodiment permits bus mode changes in accordance with the characteristic changes in the input/output requests issued by the CPU 1. Unless two or more buses fail simultaneously, data transfer and control data transfer are executed advantageously over an independent bus each. The storage controller 2a of the second embodiment comprises two channel adapters 521a and 521b and two storage device adapters 522. Alternatively, the storage controller 2a may have any desired numbers of channel adapters and storage device adapters.

According to the storage controller and the bus control system for use therewith, the way the buses are used is tuned automatically to the appropriate mode that emphasizes data transfer throughput or control data throughput in order to reflect the current bus load characteristics. This makes it possible to make effective use of the resources constituting the storage controller even as the operation mode of the connected computer system changes over time.

We claim:

1. A storage controller connected between a processor and a storage device for controlling data transfer therebetween, comprising:

a storage device adapter for controlling said storage device;

a cache memory for storing part of the data held in said storage device;

a channel adapter for communicating with said processor and for processing input/output requests received from said processor;

a control memory for storing control information used for communication between said storage device adapter and said channel adapter;

a plurality of buses each connected to at least two of said storage device adapter, said cache memory, said channel adapter and said control memory to transfer data and control information;

bus load estimating means for obtaining an index for bus load characteristics indicating a proportion of data transfer and control information transfer on said plurality of buses;

bus mode selecting means for selecting one of a plurality of a bus mode that determines utilization of said buses based on the index obtained by said bus load estimating means; and each of said storage device adapter having bus access means and said channel adapter, for accessing said buses in accordance with the bus mode selected by said bus mode selecting means:

wherein said bus load estimating means includes sequential access residual byte detection means for detecting the residual bytes of sequential access of data transfer to said storage device, wherein said estimating means adopts the residual bytes of sequential access as said index.

2. A storage controller according to claim 1, wherein said bus load estimating means includes means for estimating bus load characteristics based on an amount of data transfer during sequential access to said storage device.

3. A storage controller according to claim 1, wherein said bus mode selecting means selects one of a sequential mode for emphasizing data transfer throughput and a random mode for emphasizing control information transfer throughput as said one bus mode.

4. A storage controller according to claim 1, wherein said bus mode selecting means selects the bus mode based on whether said residual bytes are increasing or decreasing.

5. A storage controller according to claim 1, wherein each of said buses is used for any one of three uses consisting of control data transfer, data transfer, and control data and data transfer, and wherein said bus mode selecting means selects for each said bus a predetermined bus use assignment pattern made of the three bus uses as said one bus mode.

6. A storage controller according to claim 3, wherein said bus load estimating means includes bus load measuring means for measuring and providing an actual bus load measurement on each of said buses and determination means for determining whether the bus loads are equally balanced among said buses on the basis of said actual bus load measurement.

7. A storage controller according to claim 6, wherein said bus mode selecting means makes a selection when said determination means has determined the bus loads are not balanced.

8. A storage controller according to claim 7, wherein said bus mode selecting means selects a bus mode which reduces dispersion of the bus loads among said buses.

9. A storage controller connected between a processor and a storage device for controlling data transfer therebetween, comprising:

a storage device adapter for controlling said storage device;

a cache memory for storing part of the data held in said storage device;

a channel adapter for communicating with said processor and for processing input/output requests received from said processor;

a control memory for storing control information used for communication between said storage device adapter and said channel adapter;

a plurality of buses each connected to at least two of said storage device adapter, said cache memory, said channel adapter and said control memory to transfer data and control information;

bus load estimating means for obtaining an index for bus load characteristics indicating a proportion of data transfer and control information transfer on said plurality of buses;

bus mode selecting means for selecting one of a plurality of a bus mode that determines utilization of said buses based on the index obtained by said bus load estimating means; and each of said storage device adapter having bus access means and said channel adapter, for accessing said buses in accordance with the bus mode selected by said bus mode selecting means, wherein each of said buses is used for one of two uses consisting of control data transfer and data transfer, and wherein said bus mode selecting means selects for each said bus a predetermined bus use assignment pattern made of the two bus uses as said one bus mode.

10. A storage controller connected between a processor and a storage device for controlling data transfer therebetween, comprising:

a storage device adapter for controlling said storage device;

a cache memory for storing part of the data held in said storage device;

a channel adapter for communicating with said processor and for processing input/output requests received from said processor;

a control memory for storing control information used for communication between said storage device adapter and said channel adapter;

a plurality of buses each connected to at least two of said storage device adapter, said cache memory, said channel adapter and said control memory to transfer data and control information;

bus load estimating means for obtaining an index for bus load characteristics indicating a proportion of data transfer and control information transfer on said plurality of buses;

bus mode selecting means for selecting one of a plurality of a bus mode that determines utilization of said buses based on the index obtained by said bus load estimating means; and each of said storage device adapter having bus access means and said channel adapter, for accessing said buses in accordance with the bus mode selected by said bus mode selecting means, wherein said plurality of buses being three buses used for any one of three uses consisting of control data transfer, data transfer, and control data and data transfer; said bus mode selecting means selecting for each said bus a predetermined bus use assignment pattern made of the three bus uses as said one bus mode during normal operation, and in the event of a failure of one of said three buses, assigning one of the other two buses to control data transfer and the other of the two other buses to data transfer, and in the event of a failure of two of said three buses, assigning the remaining one of said three buses to control data and data transfer.

11. A bus control method for a storage controller connected between a central processing unit and a storage unit and comprising a plurality of modules and a plurality of buses transferring data and control information between the modules, said method comprising the steps of:

obtaining, by one of the modules, bus load characteristics representing a proportion of data transfer and control information transfer on said plurality of buses;

selecting, by said one module, one of a plurality of bus modes that determines bus utilization based on the bus load characteristics;

communicating the selected bus mode selected in said selecting step from said one of the modules to the other of said modules; and accessing, by each of said modules, said buses in accordance with said selected bus mode;

wherein said selecting step includes a step of allocating at least one of data transfer and control information transfer to each of said buses according to said selected bus mode.

12. A bus control method for a storage controller connected between a central processing unit and a storage unit and comprising a plurality of modules and a plurality of buses transferring data and control information between the modules, said method comprising the steps of:

obtaining, by one of the modules, bus load characteristics representing a proportion of data transfer and control information transfer on said plurality of buses;

selecting, by said one module, one of a plurality of bus modes that determines bus utilization based on the bus load characteristics;

communicating the selected bus mode selected in said selecting step from said one of the modules to the other of said modules; and accessing, by each of said modules, said buses in accordance with said selected bus mode wherein said obtaining step includes the steps of measuring bus loads of said buses, and detecting residual byte of sequential access of data transfer to said storage unit and wherein said selecting step selects the one bus mode in accordance with said bus loads and said residual bytes.

13. A bus control method according to claim 11, further comprising a step of determining whether said bus loads of said buses are balanced among said buses, and wherein said selecting step is executed when the bus loads are not balanced as a result of said determining.

* * * * *